(12) United States Patent
Harris, III

(10) Patent No.: US 12,496,922 B2
(45) Date of Patent: Dec. 16, 2025

(54) UTILITY POLE MOUNTED CHARGING STATION

(71) Applicant: Harrison Metals, Inc., San Antonio, FL (US)

(72) Inventor: John William Harris, III, Wesley Chapel, FL (US)

(73) Assignee: Harrison Metals, Inc., San Antonio, FL (US)

( * ) Notice: Subject to any disclaimer, the term of this patent is extended or adjusted under 35 U.S.C. 154(b) by 583 days.

(21) Appl. No.: 18/060,714

(22) Filed: Dec. 1, 2022

(65) Prior Publication Data

US 2024/0075833 A1    Mar. 7, 2024

Related U.S. Application Data

(60) Provisional application No. 63/338,065, filed on May 4, 2022.

(51) Int. Cl.
| | |
|---|---|
| *B60L 53/30* | (2019.01) |
| *B60L 53/18* | (2019.01) |
| *B60L 53/31* | (2019.01) |
| *B60L 53/63* | (2019.01) |

(52) U.S. Cl.
CPC .............. *B60L 53/30* (2019.02); *B60L 53/18* (2019.02); *B60L 53/305* (2019.02); *B60L 53/31* (2019.02); *B60L 53/63* (2019.02)

(58) Field of Classification Search
CPC ....................................................... B60L 53/30
USPC ........................................................ 320/109
See application file for complete search history.

(56) References Cited

U.S. PATENT DOCUMENTS

| | | | |
|---|---|---|---|
| 6,964,463 B1 * | 11/2005 | Hindle | H01M 50/202 312/291 |
| 2010/0013436 A1 * | 1/2010 | Lowenthal | G07C 5/008 320/109 |
| 2010/0283426 A1 * | 11/2010 | Redmann | B60L 3/0069 320/109 |
| 2013/0015707 A1 * | 1/2013 | Redmann | B60L 5/00 307/39 |
| 2013/0268433 A1 * | 10/2013 | Viner | B60L 53/14 705/40 |
| 2019/0093382 A1 * | 3/2019 | Sauber | E04H 12/187 |
| 2020/0055416 A1 * | 2/2020 | Johansen | B60L 53/305 |
| 2020/0084831 A1 * | 3/2020 | Urban | H02J 13/00024 |
| 2020/0108728 A1 * | 4/2020 | Kim | B60L 53/67 |
| 2020/0182451 A1 * | 6/2020 | Girouard | H01Q 1/1242 |
| 2020/0189412 A1 * | 6/2020 | Rauma | B60L 53/52 |
| 2021/0170894 A1 * | 6/2021 | Deh | B60L 53/18 |
| 2022/0263457 A1 * | 8/2022 | Akhavan-Tafti | H02S 40/20 |

(Continued)

*Primary Examiner* — Jerry D Robbins
(74) *Attorney, Agent, or Firm* — Larson & Larson; Frank Liebenow

(57) ABSTRACT

A utility pole mounted charging station includes an enclosure for housing the charging station. The enclosure has a way to be mounted to the utility pole, coming in two sections that are bolted together around the utility pole. The charging station receives power, preferably by power lines that pass through a hollow core of the utility pole. Within the enclosure is an electric vehicle charging circuit that receives power from the power lines and the electric vehicle charging circuit provides charging power to a vehicle by way of a charging cable and a charging connector. A front access panel of the enclosure is held to the enclosure by a plurality of security screws.

12 Claims, 4 Drawing Sheets

(56) References Cited

U.S. PATENT DOCUMENTS

| | | | |
|---|---|---|---|
| 2022/0305929 A1* | 9/2022 | Jin | H02J 7/0042 |
| 2023/0123030 A1* | 4/2023 | Rauma | H02G 3/0493 |
| | | | 320/109 |
| 2023/0187913 A1* | 6/2023 | Grant, Jr. | H02G 1/04 |
| | | | 254/134.3 R |
| 2023/0339355 A1* | 10/2023 | Hester | G06Q 50/06 |

* cited by examiner

UTILITY POLE MOUNTED CHARGING STATION

FIELD OF THE INVENTION

This invention relates to the field of electric vehicle charging and more particularly to charging station that mounts to a utility pole.

BACKGROUND OF THE INVENTION

As electric vehicles become more prevalent, charging stations need be deployed to many locations to enable charging, especially when the electric vehicle is parked, perhaps in a public parking area. Today, charging stations typically include a pedestal that requires a cement slab for structural support and, usually, underground connections to utilities, for example, 220-240 VAC. There are several drawbacks to installing such pedestal-mounted charging stations including high material costs, high installation costs, complicated construction permits, connection to power (typically underground), difficulty in metering power supplied to the charging station, and vulnerability to motorists that are less than cautious. The high material costs include the cost of the land, the cost for the cement slab, the cost for the pedestal, and the cost for the charging station. The high installation costs include running an underground power feed, digging, pouring cement, waiting for the cement to dry, etc. In addition, the land is not free.

What is needed is a charging station that will reduce many of the above noted costs and provide charge-back data to the utility company (electric company) that provides the power.

SUMMARY OF THE INVENTION

In many municipalities, utility poles provide for power distribution to homes, offices, streetlights, etc. In many situations, these utility poles are located proximal to parking areas, typically between streets and sidewalks or around a periphery of a parking lot. The utility pole mounted charging station provides for a charging station in such locations that is lower cost as well as quicker to install than a pedestal-mounted equivalent as the municipality or utility already has right-of-way and ownership of the utility pole. Further, the utility pole already has accessible power (e.g., 220-240 VAC), the utility pole is often proximal to a parking space, and the utility pole is more structurally sound than a metal pillar. Therefore, the utility pole mounted charging station utilizes utility poles for structural support and for providing power. In some embodiments, the pole mounted charging station includes an integrated power usage meter for charging the owner of the pole mounted charging station (e.g., a municipality) for electricity that is consumed by the pole mounted charging station.

In one embodiment, a utility pole mounted charging station is disclosed including an enclosure for housing the charging station. The enclosure has a way to be mounted to the utility pole and surrounds the utility pole by securely bolting together two sections of the enclosure. The charging station receives power, preferably by power lines that pass through a hollow core of the utility pole. Within the enclosure is an electric vehicle charging circuit that receives power from the power lines and the electric vehicle charging circuit provides charging power to a vehicle by way of a charging cable and a charging connector. A front access panel of the enclosure is held to the enclosure by a plurality of security screws.

In another embodiment, a utility pole mounted charging station is disclosed including an enclosure that mounts to a utility pole. Within the enclosure there is a way to receive power from a power line coming from within the utility pole. The utility pole mounted charging station includes an electric vehicle charging system receiving power from the means for receiving power (e.g., through a circuit breaker and/or a power meter) and the electric vehicle charging system provides charging power to a vehicle by way of a charging cable and a charging connector. A front access panel is held to the enclosure by a plurality of screws (e.g., tamper resistant screws).

In another embodiment, a method of mounting a utility pole mounted charging station to a utility pole is disclosed. A power line passes through the utility pole. The method includes forming an orifice in the utility pole for access to the power line at a location where the utility pole mounted charging station is to be mounted and connecting a circuit breaker of the utility pole mounted charging station to the power line. A first engagement member of a front section of the utility pole mounted charging station is positioned around one side of the utility pole and a second engagement member of a back section of the utility pole mounted charging station is positioned around an opposing side of the utility pole then the front section of the utility pole mounted charging station is bolted to the back section of the utility pole mounted charging station. In this way, the first engagement member and the second engagement member are pressed against the utility pole, holding the utility pole mounted charging station to the utility pole. Power is provided to the utility pole mounted charging station from the power line.

In another embodiment, a utility pole mounted charging station is disclosed including an enclosure having two sections: a front section and a back section. The first section has a first engagement member for positioning around one side of the utility pole and the second section has a second engagement member for positioning around an opposing side of the utility pole. There is at least one bolt for securing the first section to the second section after mounting on the utility pole. A circuit breaker is included within the housing. A first side of the circuit breaker is connected to a power line that comes from within the utility pole. An electric meter is included within the housing. A first side of the electric meter connected to a second side of the circuit breaker. An electric vehicle charging system receives power from the electric meter and provides charging power to a vehicle by way of a charging cable and a charging connector.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
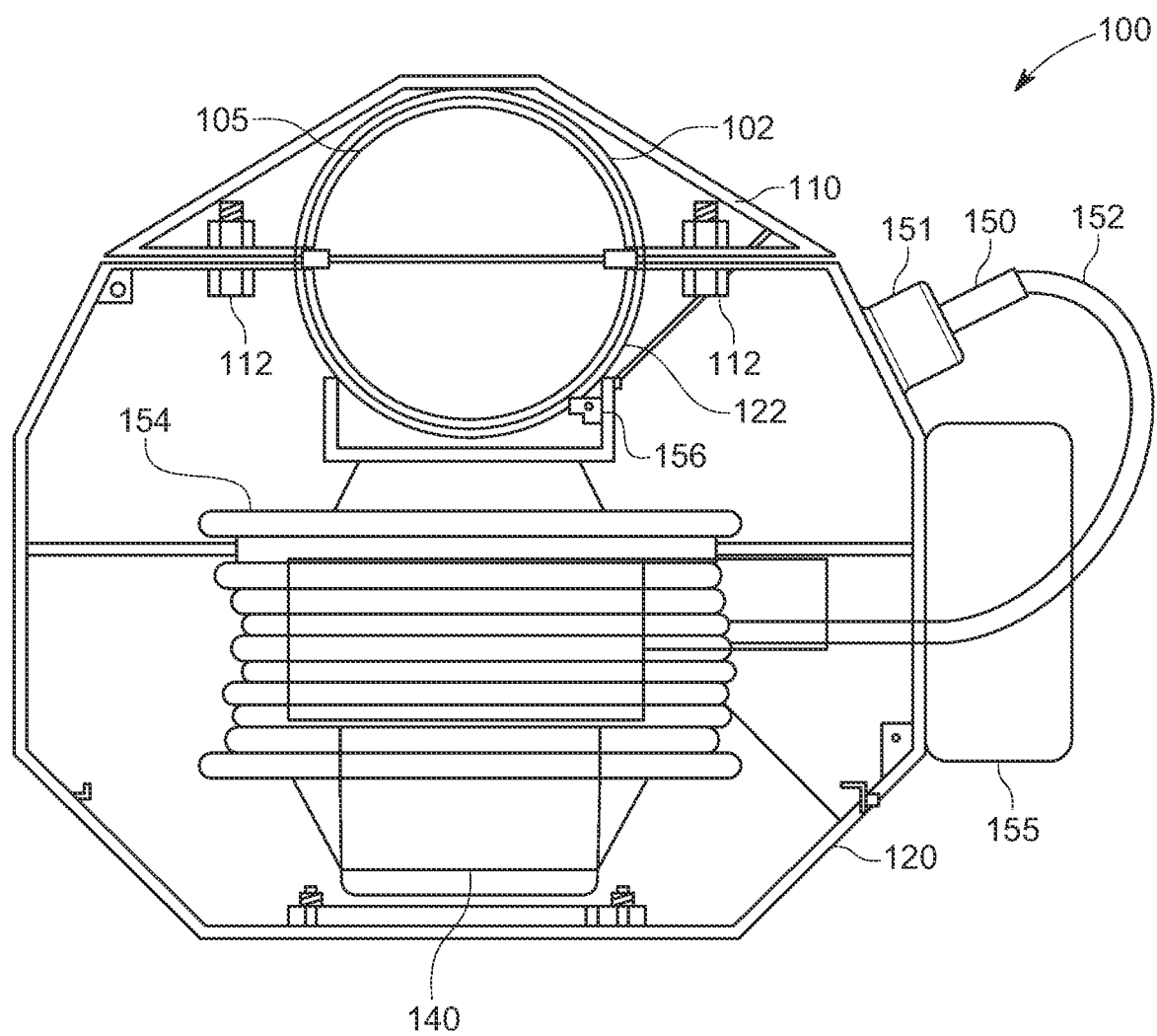
FIG. 1 illustrates a top-schematic view of a utility pole mounted charging station.

Reference will now be made in detail to the presently preferred embodiments of the invention, examples of which are illustrated in the accompanying drawings. Throughout the following detailed description, the same reference numerals refer to the same elements in all figures.

It should be noted that there are several types of utility poles. Older style utility poles are made of pressure treated wood while many newer utility poles (e.g., for transmission lines or for streetlights) are made of metal such as aluminum or, is some cases made of concrete. Utility poles also vary in cross-sectional width, for example, 8 inches, 10 inches, 12 inches. Many aluminum or concrete utility poles are hollow. In many areas, underground utilities provide power to streetlights and there is an access panel at the bottom of the utility poles. The power lines are typically routed through the hollow center to the streetlight above. The utility pole mounted charging station is anticipated for use on any type of utility pole, but works best for hollow utility poles, as such provides improved access to power.

Figure 2:
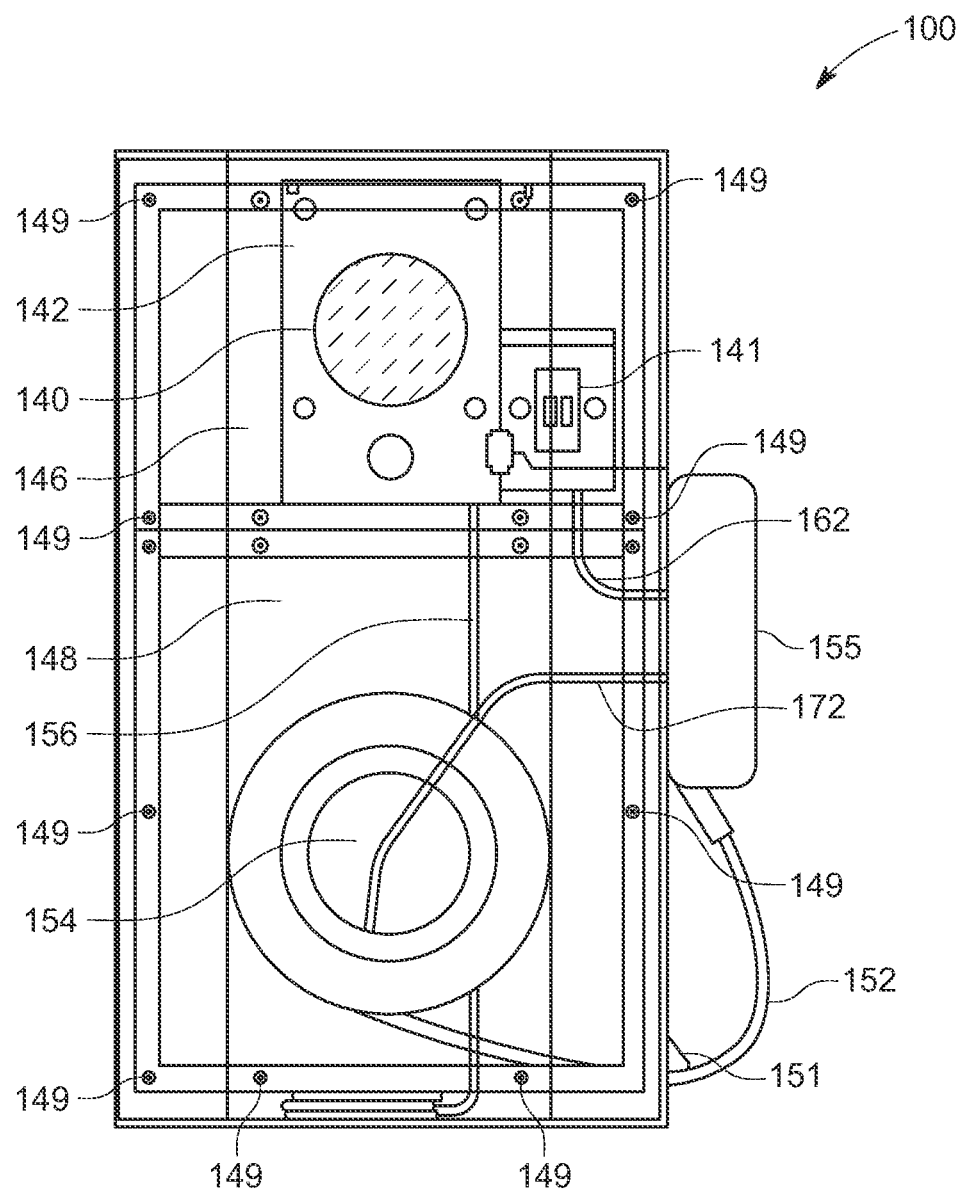
FIG. 2 illustrates a front-schematic view of the utility pole mounted charging station.
Figure 3:
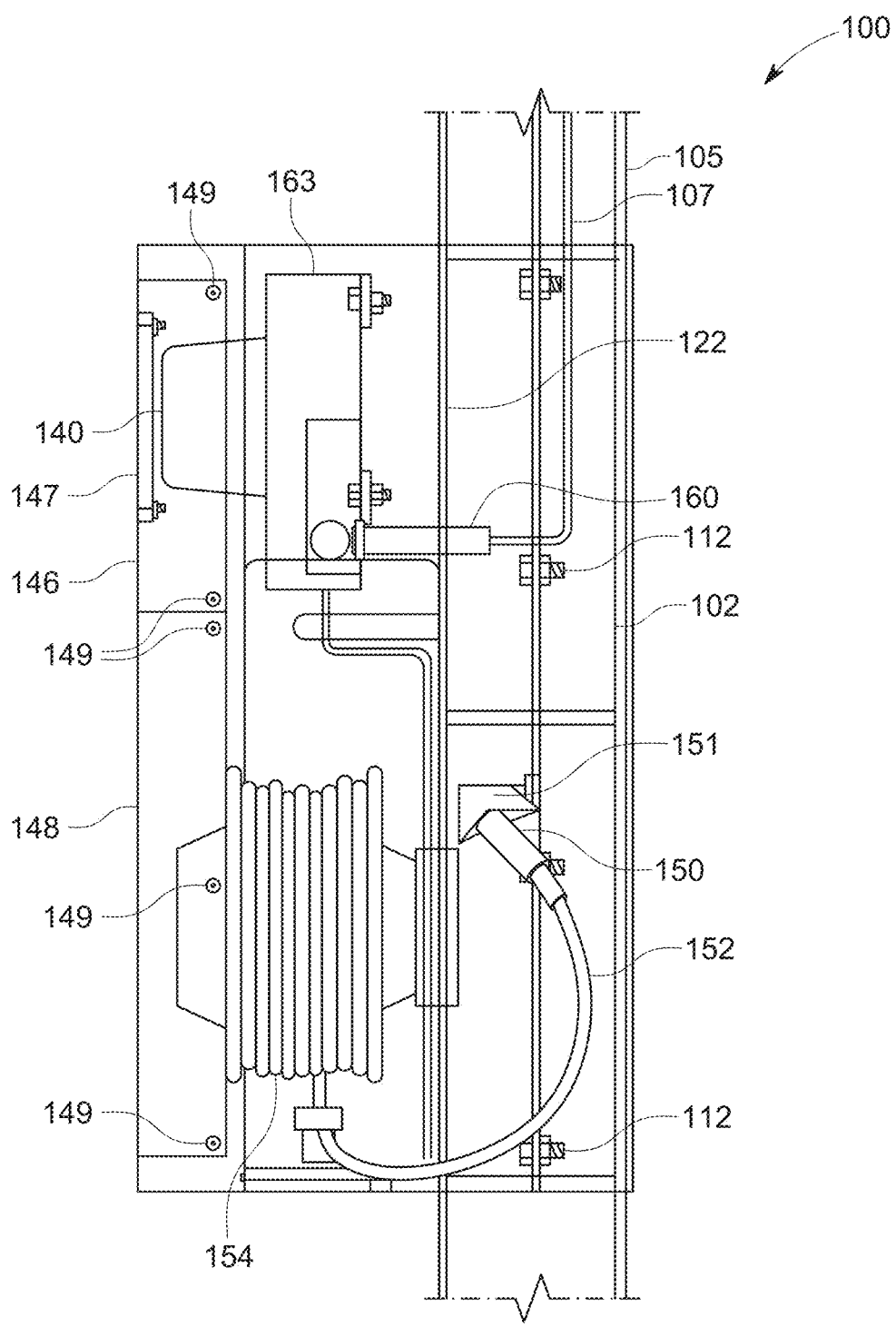
FIG. 3 illustrates a side-schematic view of the utility pole mounted charging station.

Referring to FIGS. 1, 2, and 3 views of a utility pole mounted charging station 100 are shown. Although the utility pole 105 used in this example is metal (e.g., aluminum) and hollow, any utility pole 105 is anticipated. The utility pole mounted charging station 100 has an enclosure that includes a back section 110 and a front section 120. In the examples shown, the back section 110 has an engagement member 102 that is substantially semi-circular, and the front section 120 has a similar, engagement member 122 that is also substantially semi-circular to match the cross-sectional shape of the utility pole 105. Note that any cross-sectional shape (e.g., square, rectangular, oval, hexagonal) is anticipated and a round utility pole 105 is shown as an example of such. For example, some utility poles 105 have a rectangular, a square, or other cross-sectional shaped, and the engagement members 102/122 have a shape that matches the cross-sectional shape of the utility pole 105.

Before installation, the power line 107 is dressed and passed through a hole in the utility pole 105 (e.g., an existing hole or newly formed hole), of course maintaining safety precautions when working with high voltages. During installation, the back section 110 is bolted to the front section 120 with bolts 112 after the engagement members 102/122 are positioned to surround the utility pole 105 at the desired height above ground level. As it is anticipated that utility poles 105 vary in size, it is anticipated that the engagement members 102/122 are fabricated to have a similar or slightly smaller diameter/width than the utility poles 105 or, in some embodiments, the engagement members 102/122 are fabricated to have a similar or slightly smaller diameter/width than the largest anticipated utility pole 105 and optional size adjustment members 170 (see FIG. 4) are provided to match the size of the utility pole 105 on which the utility pole mounted charging station 100 is to be mounted. Once the utility pole mounted charging station 100 is physically mounted to the utility pole 105, the power line 107 is connected (e.g., connected to the circuit breakers 141) to provide electrical power to the utility pole mounted charging station 100.

The utility pole mounted charging station 100 has a mechanism to receive power, preferably from a power line 107 (see FIG. 3) that is fed through a hollow core of the utility pole 105. In such, prior to installing the utility pole mounted charging station 100 onto the utility pole 105, an access hole (not shown) is made in the utility pole 105 to feed a power line 107 (e.g., two conductors or three conductors and a ground) from inside the utility pole 105, thereby providing power to the utility pole mounted charging station 100. As shown in FIG. 3, in some embodiments, there is a section of conduit 160 that passes through this hole and through which the power line 107 wires pass to protect the power line 107 wires from damage and potential shorts.

In some embodiments, a electric meter 140 is provided to measure power usage by the utility pole mounted charging station 100 for charge-back to the owner of the utility pole mounted charging station 100 (e.g., the municipality, a private entity, the electric power provider). For example, in embodiments in which the utility pole 105 is a streetlight, power usage by the streetlight is often charged as a fixed monthly cost. Therefore, power consumed by the utility pole mounted charging station 100 needs to be charged to the owner (e.g., the township, city, municipality, or private entity that owns the utility pole mounted charging station 100). In some embodiments, it is possible to eliminate the electric meter 140 when the electric circuit to the utility pole is already metered. In some embodiments, the electric meter 140 is housed in a meter box 163 along with the circuit breakers 141.

In some embodiments, the electric meter 140 is housed within a power meter shroud 142 having an aperture through which the visible face of the electric meter 140 extends. In some embodiments, the power meter transmits a meter reading signal for reception by the power company as is known in the industry, not requiring a meter reader visit the utility pole mounted charging station 100.

In some embodiments, a ground wire 156 (e.g., earth ground) passes through one of the semi-circular engagement members 102/122, providing a ground to the utility pole mounted charging station 100.

In some embodiments, the utility pole mounted charging station 100 is protected by one or more circuit breakers 141. Power (either direct or through the electric meter 140) passes through the circuit breakers 141 and into the electric vehicle charging system 155 through an input cable 162. In some embodiments, part or all of the electric vehicle charging circuit are within the electric vehicle charging system 155. Details of the electric vehicle charging system 155 are omitted for brevity and clarity purposes, as electric vehicle charging stations are well known in the art and any known of future electric vehicle charging system 155 is anticipated for use in/on the utility pole mounted charging station 100. Typically, the electric vehicle charging system 155 includes charge control circuitry, ways to determine the charge capability of the vehicle being charged (e.g., using a communications interface such as wireless or nearfield technology), and billing collection circuitry for user authorization and/or to charge the owner of the vehicle for electricity used to charge the vehicle.

The output line 172 of the electric vehicle charging system 155 is connected to a charging cable 152 to provide charging power to charge an electric vehicle. Although any type of charging cable 152 is anticipated, as people often do not properly return the power cords to hooks that are provide, in the embodiments shown, a retractable cord spool 154 is used to store the charging cable 152 when not in use. The charging cable terminates with a charging connector 150.

In some embodiments, the utility pole mounted charging station 100 includes a rain guard 151 to reduce moisture on the charging connector 150 (e.g., an industry standard charging connector as accepted by most electric vehicles), the charging connector being electrically connected to a distal end of the charging cable 152.

In some embodiments, the electric vehicle charging system 155 includes a wireless interface (e.g., Wi-Fi, Bluetooth) for communicating with the vehicle being charged to determining charging characteristics and for billing purposes. In some embodiments, a wireless interface (same or different) provides communications to a central computing environment to transmit account information, approval to charge, usage data, etc.

In some embodiments, there is a front access panel 146/148, shown here as an upper front access panel 146 and a lower front access panel 148. In some embodiments having a electric meter 140, the upper front access panel 146 includes a transparent or translucent window 147 through which the electric meter 140 (and optionally the circuit breakers 141) are visible, for example, for reading the electric meter 140.

For safety reasons, the front access panel(s) 146/148 are fastened using security screws 149, providing resistance to tampering.

Figure 4:
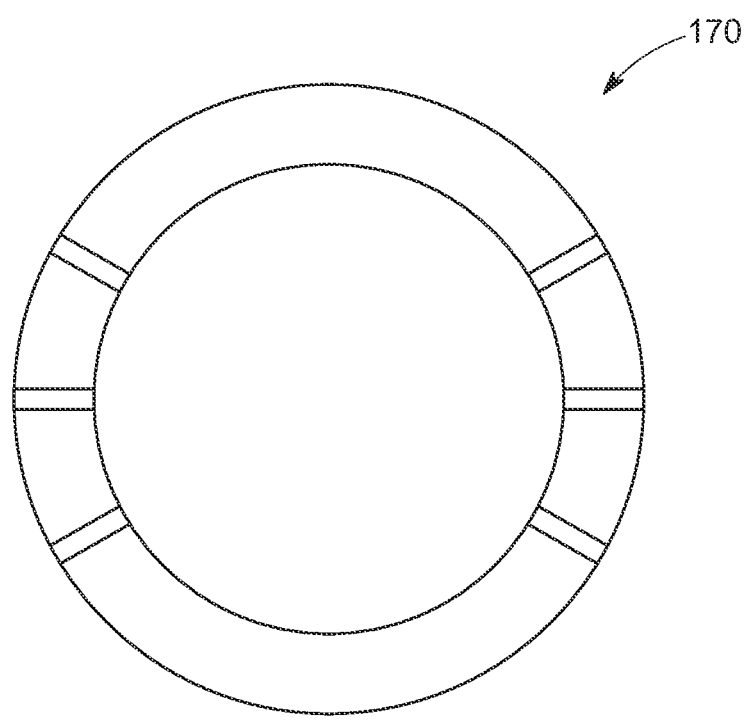
FIG. 4 illustrates an optional size adjustment ring of the utility pole mounted charging station.

Referring to FIG. 4, a size adjustment member 170 option of the utility pole mounted charging station is shown. In some embodiments, the engagement members 102/122 are fabricated to have a similar or slightly smaller diameter/width than the largest anticipated utility pole 105 and size adjustment members 170 are provided to match the size and/or shape of any smaller utility poles 105 on which the utility pole mounted charging station 100 is to be mounted. For example, if the universe of utility poles 105 include utility poles 105 with 6-inch, 8-inch, 10 inch, and 12-inch diameters or widths, then in such embodiments, the engagement members 102/122 are fabricated to have a similar or slightly smaller diameter/width than the maximum, 12-inch diameter, and size adjustment members 170 are provided to adjust from the 12-inch diameter/width to 10-inch, 8-inch, and 6-inch.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of mounting a utility pole mounted charging station to a utility pole, a power line passing through the utility pole, the method comprising:
    forming an orifice in the utility pole at a location where the utility pole mounted charging station is to be mounted;
    connecting a circuit breaker of the utility pole mounted charging station to the power line;
    positioning a first engagement member of a front section of the utility pole mounted charging station around one side of the utility pole;
    positioning a second engagement member of a back section of the utility pole mounted charging station around an opposing side of the utility pole;
    bolting the front section of the utility pole mounted charging station to the back section of the utility pole mounted charging station, thereby the first engagement member and the second engagement member are pressed against the utility pole, holding the utility pole mounted charging station to the utility pole; and
    providing power to the utility pole mounted charging station from the power line.

2. The method of claim 1, wherein the utility pole is smaller than the first engagement member and second engagement member, the method further comprising placing an adjustment member around the utility pole before the step of positioning a first engagement member.

3. The method of claim 1, wherein the method further comprises attaching a front panel to the front section of the utility pole mounted charging station and to the back section of the utility pole mounted charging station.

4. The method of claim 3, wherein the attaching of the front panel to the front section of the utility pole mounted charging station and to the back section of the utility pole mounted charging station using security screws.

5. A utility pole mounted charging station, the utility pole mounted charging station comprising:
    an enclosure having two sections comprising a front section and a back section;
    the front section comprises a first engagement member for positioning around one side of the utility pole;
    the back section comprises a second engagement member for positioning around an opposing side of the utility pole;
    at least one bolt for securing the front section to the back section after mounting on the utility pole;
    a circuit breaker, a first side of the circuit breaker connected to a power line that comes from within the utility pole;
    an electric meter, a first side of the electric meter connected to a second side of the circuit breaker; and
    an electric vehicle charging system receiving power from the electric meter and the electric vehicle charging system providing charging power to a vehicle by way of a charging cable and a charging connector.

6. The charging station of claim 5, further comprising a front access panel.

7. The charging station of claim 6, wherein the front access panel is held to the first section and the second section by a plurality of screws.

8. The charging station of claim 7, wherein the electric meter is mounted within the enclosure.

9. The charging station of claim 8, wherein the front access panel includes a window that is transparent or translucent, covering the electric meter for reading the electric meter without opening the enclosure.

10. The charging station of claim 5, further comprising a retractable cord spool, the charging cable extendable from the charging station and retractable back into the charging station by way of the retractable cord spool.

11. The charging station of claim 10, wherein at least part of the charging cable is wound around a retractable cord spool when not in use.

12. The charging station of claim 5, wherein the electric vehicle charging system comprises a communications interface for user authorization and billing of usage.

* * * * *